June 3, 1952 L. J. CAREY 2,598,971
WINDSHIELD WIPER MECHANISM
Filed Jan. 4, 1947 2 SHEETS—SHEET 1
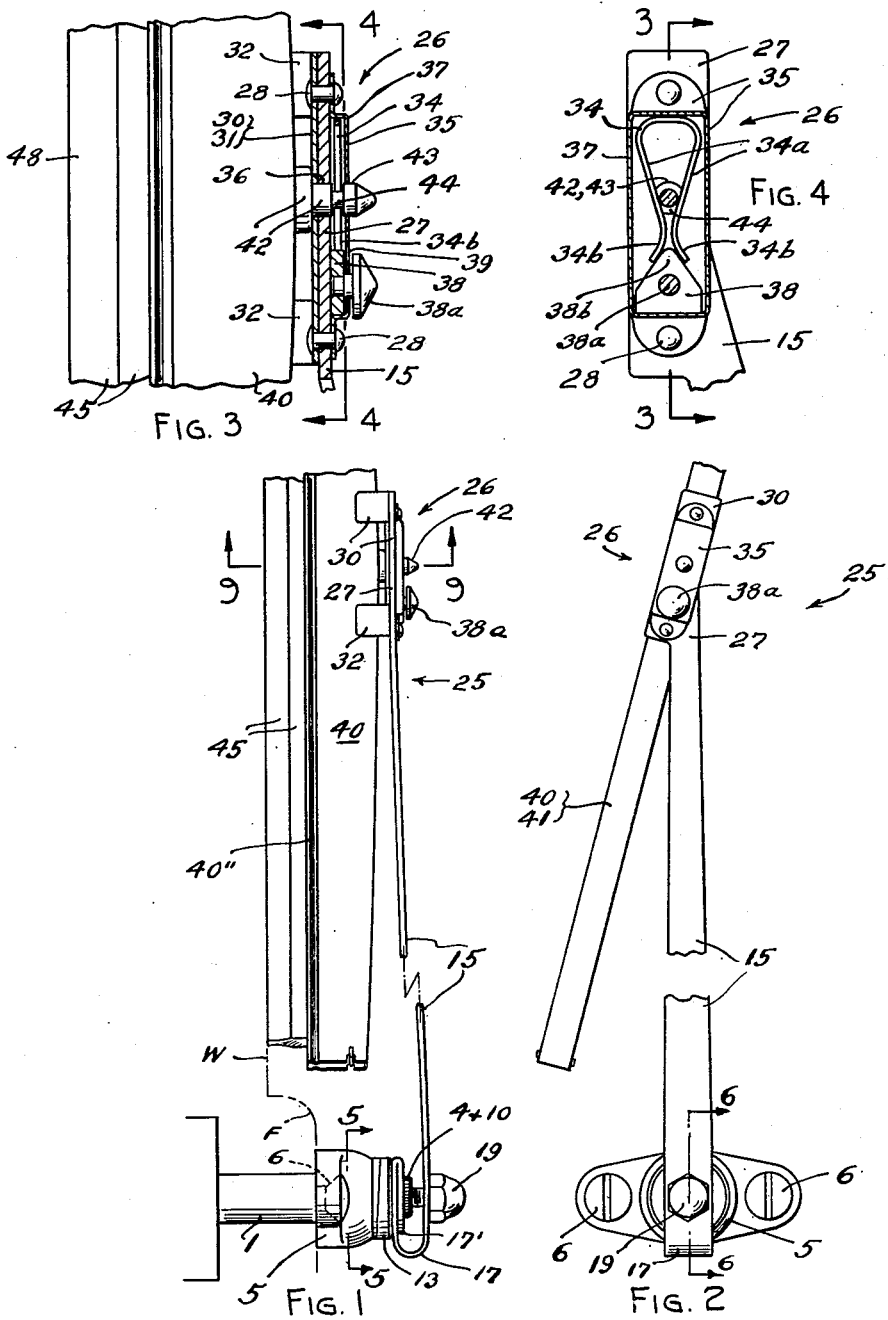
INVENTOR.
LEROY J. CAREY
BY George M Soule
ATTORNEY June 3, 1952   L. J. CAREY   2,598,971
WINDSHIELD WIPER MECHANISM
Filed Jan. 4, 1947   2 SHEETS—SHEET 2

INVENTOR.
LEROY J. CAREY
BY George M. Soule
ATTORNEY

Patented June 3, 1952

2,598,971

UNITED STATES PATENT OFFICE 2,598,971

WINDSHIELD WIPER MECHANISM

Leroy J. Carey, Cleveland, Ohio, assignor to The Marquette Metal Products Company, Cleveland, Ohio, a corporation of Ohio Application January 4, 1947, Serial No. 720,297

2 Claims. (Cl. 15—250)

This invention relates to an improvement in wiper mechanisms for vehicle windshields and the like, thus indicating the general object. The mechanism is particularly concerned with the wiping of curved surfaces and surfaces of compound character—for example, curved areas merging into planar areas—thus indicating a further object.

L. J. Carey Patent 2,412,319 issued December 10, 1946 discloses a wiper drive arm mounting arranged to cause a blade-carrying portion of a wiper drive arm to follow a preselected curve. This application discloses an improved and simplified form of said mechanism. Reference is also made to L. J. Carey application Serial No. 671,728 filed May 23, 1946, now Patent No. 2,493,527, January 3, 1950, for a drive arm on the order of that shown herein. The objects hereof include provision of an improved drive arm and supporting or mounting means therefor.

A specific object is to provide an improved squeegee and mounting or backing means therefor.

A further object is to provide a simple quick-detachable positive lock connector for a blade unit and a drive arm unit.

Other objects and features will become apparent from the following description of the preferred forms shown in the accompanying drawings wherein:

Figs. 1 and 2 are side and front elevational views showing the general wiper assembly hereof, partly broken away;

Figs. 3 and 4 are sectional views taken on planes as indicated at 3—3 on Fig. 4 and 4—4 on Fig. 3, showing the quick-detachable connector between the blade holder hereof and the drive arm;

Figure 5:
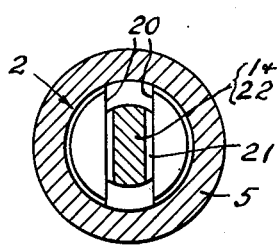
Figs. 5 and 6 are transverse and longitudinal sectional views taken as indicated on Figs. 1 and 2 respectively of the drive arm guiding head connection with a drive shaft such as that of a motor or window unit.

The present mechanism enables efficient wiping of progressively varying curved surfaces by employment of the principle demonstrated by Carey Patent 2,412,319 in conjunction with a blade having provision for a considerable amount of wiping-pressure-maintaining and surface-mating flexibility in a direction normal to the surface to be wiped.

Figs. 1, 2, 5, and 6 show the simplified arm driving mechanism in a form similar to that of said patent. The drive shaft 1 of a suitable motor, not shown, has a universal driving connection 2, Fig. 6, with a spherically formed head portion 3 of a universally movable extension stub shaft 4 projecting from a supporting body 5 for said stub shaft and the wiper mechanism carried thereby. The supporting body 5 is usually attached to an appropriate fixed part of the vehicle body (e. g. windshield frame F) as by screws 6; and said body 5 is interiorly formed, at 7, complementary to the generally spherical stub shaft portion 3. The stub shaft projects loosely through an opening 8 of the body 5, so that the outer end of the stub shaft is limited for gyrating movement progressively into various angular relationships to the drive shaft. An externally splined (e. g. uniformly serrated) portion 10 of the stub shaft projects through a circular cam or ramp couple comprising a flat somewhat inclined flat face 11 on the body 5 around the stub shaft and a complementary flat face 12 on a wedge shaped circular plate or washer 13 operatively adjacent the face 11 in sliding contact therewith and splined for free axial movement on the stub shaft at the serrations of the shaft portion 10. The head portion 16 of the drive arm 15 is similarly splined and thereby drivingly connected to the stub shaft 4 at said serrated portion 10.

Figure 6:
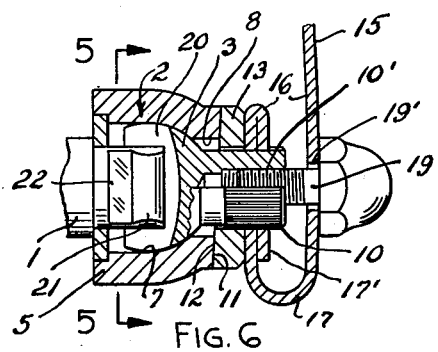

The drive arm preferably comprises a single piece spring strip made of flat metal stock, the head portion Figs. 1 and 6 being constituted by an open spring loop 17 of the stock and a single close fold 17' thereof. The folded portion 17' is internally splined to fit the serrations at 10; and the entire head 16 is held on the stub shaft by a single screw 19 extending through an opening 19' in the outer part of the head for threaded connection with the stub shaft at a socket 10' in the stub shaft. The head of the screw 19, by forcing against the outer spring portion of the drive arm, adjusts the pressure of the wiper blade against the windshield and at the same time maintains the folded portion 18 of the drive arm in yielding pressure contact with the circular cam plate 13, thus holding the ramp faces 11 and 12 in the necessary sliding contact as the stub shaft gyrates about the center of the spherical head 3.

Full face to face contact is normally maintained at 11 and 12 by strong pressure force since the effective spring arms formed by the loop 17 are very short. The spring force against the screw head is sufficient to prevent the screw from becoming loosened by vibration.

The gyratory motion of the stub shaft 4 in the supporting body 5, causes the wiper blade to move in an arc as required to maintain the blade approximately in uniform relationship to a windshield surface having a curve corresponding approximately to that arc. Change in the slope of the ramp surfaces 11 and 12 changes the arc along which the free end of the drive arm travels.

To make certain that the surfaces 11 and 12 are assembled in proper relationship, since the circular ramp plate 13 can be variously turned as mounted on the spline serrations at 10, the adjacent peripheral surfaces of the body and circular plate are provided with match marks or indicators (not shown). When the axis of curvature of the glass is centered with relation to the drive shaft 1 then the match indications should register when the drive shaft has performed exactly half its oscillatory movement.

The universal drive connection 2 between the drive shaft 1 and its extension or stub shaft 4 comprises a parallel sided channel slot 20, Figs. 5 and 6, in the generally spherical head of the stub shaft and a generally cylindrical head element 21 on the drive shaft connected to the main portion of the shaft by a neck portion 22 of reduced width in a direction normal to the axis of the cylinder formation 21. Said axis passes approximately through the center of the spherical head formation of the stub shaft, hence the stub shaft is always free to pivot about said center in planes at right angles to each other as will be obvious from Figs. 5 and 6. The universal joint thus provided has no lost motion beyond that required for manufacturing clearance.

Figure 9:
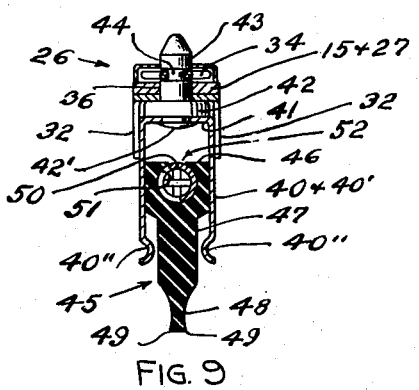

The wiper assembly 25 at the outer end of the drive arm 15 includes a connector device 26 shown principally by Figs. 3, 4, and 9. The connector 26 may be of the fixed wiper angle type (as illustrated) or the controlled wiper angle type requiring a guide rod linkage or equivalent means to maintain the wiper oriented with the principal axis of curvature of the windshield or for any other purpose. The Carey patent, identified above, shows such guide rod linkage.

In Figs. 1 to 4 and 9 hereof the outer end portion 27 of the drive arm is shown as secured rigidly as by rivets 28 to a saddle clip 30 of sheet metal having a base portion 31 and substantially rigid tongues 32 projecting therefrom generally parallel to each other in pairs. The tongues embrace adjacent portions of a blade holder 40 of generally channel shaped form as will be evident from comparison of Figs. 7 and 9. The web 41 of the blade holder channel has a stud 42 secured rigidly thereto as by riveting at 42' (Fig. 9) and the stud is part of a quickly detachable connection between the blade holder 40 and the drive arm. The stud 42 would ordinarily serve as a pivot for the blade assembly. The saddle in the particular construction shown operates, principally through the tongues 32 bearing on the blade holder channel, to prevent any pivoting of the blade assembly about the axis of the connector stud and the saddle lends strength to the quick detachable connection.

Referring further to Figs. 3, 4, and 9, the stud 42 has a reduced generally cylindrical fastener-pin portion 43 peripherally grooved as at 44 to form a reduced diameter neck. The outer end of the pin portion 43 is of bullet nosed or tapered form to enable snap-fastening engagement with a securing spring 34 in a housing 35 secured to the drive arm portion 27 on the side thereof opposite the saddle clip. The latter, said drive arm portion 27 and the housing 35 have mutually aligned apertures, one indicated at 36, easily receiving the pin 43. The spring is preferably retained in position principally by the generally rectangular casing portion 37 and adjacent surface of the drive arm portion 27 in cooperation with a spring releasing slider block 38 arranged to slide easily in the casing portion 37 of the spring housing as will be evident from comparison of Figs. 3 and 4. The block 38 has an operating button 38a lying outside the spring housing but having a reduced neck connection with the block extending through a slot 39 in the outer wall of the housing. The spring 34 has converging leg portions 34a terminating in diverging curved portions 34b acted upon by the tapered nose portion 38b of the spreader block.

In operating the detachable connector for securing the blade assembly to the drive arm the bullet nose of the pin 43 spreads the spring to enable the legs 34a thereof to seat in the groove 44. Thereafter the blade assembly can only be detached by operating the spring release button 38a.

When pivotal movement of the blade holder generally parallel to the plane of movement of the drive arm is desired, then the saddle 31 is suitably made rigid with the stud 42 instead of being rigid with the drive arm, and the stud constitutes a main detachable pivot connection with the drive arm. The saddle in such case would have a laterally projecting arm for connection with a guide rod or link not shown herein but commonly known in the art.

The angular relationship between the blade assembly and drive arm as shown by Figs. 2 and 4 illustrates one example of a number of special installations. In most wiper installations for curved glass, if the blade is in any fixed relationship to an oscillating drive arm the wiping edge of the blade in effect encounters differently curved areas. The blade mounting shown by Figs. 7, 8, and 9 enables the blade to flex in planes normal to the surface to be wiped, thus accommodating the different surface effects encountered.

Figure 7:
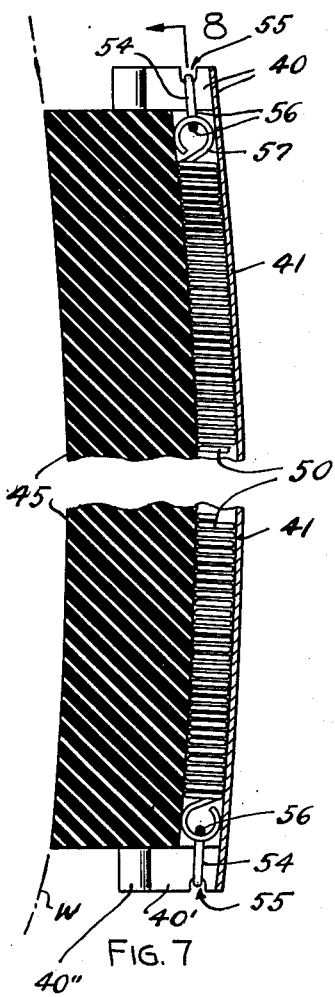
Fig. 7 is a longitudinal central sectional view of the preferred blade holder and blade, the arm attachment portion intermediately of the ends of the holder being broken away.
Figure 8:
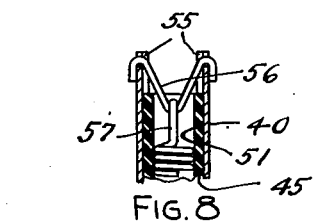
Figs. 8 and 9 are sectional detail views of the blade and holder, taken as indicated on Figs. 7 and 1 respectively; and, Fig. 10 is a view similar to Fig. 9 showing a modified flexible blade element.

The channel 40, as shown by Figs. 1 and 7, is of diminishing depth from its point of attachment to the drive arm toward opposite ends. The web 41 is arched to provide such diminishing depth and, preferably, the flanges 40' of the channel terminate, remotely of the web, in spaced straight bead or rib formations 40''. The channel is open at its opposite ends.

The blade 45 may be molded or extruded in straight form from suitably elastic rubber or rubber-like material with a thickened back portion 46, a thinner and hence more flexible central portion 47 and a still more flexible wiping edge portion 48 of further reduced thickness presenting at least two relatively sharp corners as at 49. The blade portion 47 is normally spaced from both ribs 40'' of the holder channel and is limited in rocking back and forth during the wiping operation by abutment with the inner curved surfaces of the ribs.

The blade is secured in the holder channel by a coiled metal tension spring 50 lying in and along a substantially complementary recess or bore 51 in the thickened back portion 46 of the blade. The spring can be assembled endwise into the recess or the latter can be laterally open as at 52 for its entire length to facilitate insertion of the spring. The spring is detachably anchored to the holder by bridge hooks or clips 54 spanning the channel flanges and maintained by the tension of the spring 50 seated in paired notches 55 in the end margins of said flanges. V-shaped hook-supporting portions 56 of the clips receive outwardly turned terminal coils 57 of the spring 50 in a manner obvious from inspection of Figs. 7 and 8.

The bridge hooks 54 maintain the spring 50 under sufficient initial tension to hold the rubber element straight for efficient wiping of flat glass surfaces and, when curved surfaces are encountered by the wiping edges, the spring yields, as illustrated, to enable the blade to wipe efficiently for its entire length. Since the spring is at the back of the blade, none of the rubber has to be stretched as the blade is flexed into curved form.

Figure 10:
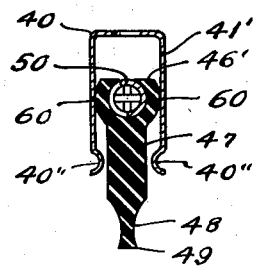

Fig. 10 illustrates a modification in the shape of the thickened back portion 46' of the rubber blade element 45, whereby the blade element can rock (alternately as driven to and fro by the drive arm) about the axis of the supporting spring 50 as a center. As shown the thickened blade back portion 46' is rounded in cross section so that substantially line contact between said portion and the flanges 42 occurs, as at 60, only in a plane coincident with the spring axis.

I claim:

1. In a wiper mechanism, a drive arm member, a blade-supporting saddle member and a fastener device connecting said members and comprising a notched pin on one member adapted to enter a pin-guiding opening in the other member along the axis of the opening, a spring arm carried on said other member and normally extending in intersecting relationship to part of the opening so as to engage the notch of the pin, and a releasing device for the spring arm slidably carried on said other member and arranged to engage the spring arm and move it out of the notch of the pin.

2. In a windshield wiper mechanism, a drive arm element and a wiper blade holder element, a quickly detachable connection between the said elements comprising a notched pin on one of the elements, a housing on the other element, a spring contained in the housing and having opposite spring arm portions with converging free ends, said portions being arranged to yield and receive the notched portion of the pin between them, and a releasing device slidably mounted in the housing and movable into spreading engagement with the converging free ends of the spring in a manner to force said spring arm portions to release the pin.

LEROY J. CAREY.

REFERENCES CITED

The following references are of record in the file of this patent:

UNITED STATES PATENTS

| Number | Name | Date |
|---|---|---|
| 428,836 | Fox | May 27, 1890 |
| 912,222 | Wonderlich | Feb. 9, 1909 |
| 2,264,167 | Paulus | Nov. 25, 1941 |
| 2,286,035 | Horton | June 9, 1942 |
| 2,303,694 | Horton | Dec. 1, 1942 |
| 2,432,693 | Anderson | Dec. 16, 1947 |